United States Patent
Criblez et al.

(10) Patent No.: US 8,647,248 B2
(45) Date of Patent: Feb. 11, 2014

(54) DEVICE FOR CONVEYING AND FOLDING BLANKS

(75) Inventors: Pascal Criblez, Sullens (CH); Olivier Favre, Bussigny (CH)

(73) Assignee: Bobst SA (CH)

( * ) Notice: Subject to any disclaimer, the term of this patent is extended or adjusted under 35 U.S.C. 154(b) by 295 days.

(21) Appl. No.: 13/121,865

(22) PCT Filed: Sep. 17, 2009

(86) PCT No.: PCT/EP2009/006716
§ 371 (c)(1), (2), (4) Date: Mar. 30, 2011

(87) PCT Pub. No.: WO2010/037475
PCT Pub. Date: Apr. 8, 2010

(65) Prior Publication Data
US 2011/0177930 A1    Jul. 21, 2011

(30) Foreign Application Priority Data
Sep. 30, 2008 (EP) .................................. 08017185

(51) Int. Cl.
*B31F 1/00* (2006.01)

(52) U.S. Cl.
USPC ............... 493/71; 493/80; 493/151; 493/416; 493/183

(58) Field of Classification Search
USPC ......... 493/68–71, 79–81, 151, 183, 177, 416, 493/446, 455; 53/381.7, 382.1
See application file for complete search history.

(56) References Cited

U.S. PATENT DOCUMENTS

| 2,899,872 | A | * | 8/1959 | Labombarde | 493/130 |
| 2,989,903 | A | * | 6/1961 | Wilcox | 493/319 |
| 3,229,596 | A | * | 1/1966 | Hottendorf | 493/179 |
| 3,285,144 | A | | 11/1966 | Frei | |
| 3,388,641 | A | * | 6/1968 | Gobel | 493/419 |
| 3,405,611 | A | * | 10/1968 | Millich | 493/177 |
| 4,018,144 | A | | 4/1977 | Stutt et al. | |
| 4,052,932 | A | | 10/1977 | Huiskes | |
| 4,108,302 | A | | 8/1978 | Wiedemann | |
| 6,228,010 | B1 | * | 5/2001 | Toriyama | 493/23 |
| 2011/0294637 | A1 | * | 12/2011 | Muller et al. | 493/23 |

FOREIGN PATENT DOCUMENTS

| DE | 19535903 A1 | 4/1997 |
| WO | WO 97/14634 | 4/1997 |

OTHER PUBLICATIONS

International Search Report dated Nov. 26, 2009, issued in corresponding international application No. PCT/EP2009/006716.

* cited by examiner

*Primary Examiner* — Hemant M Desai
(74) *Attorney, Agent, or Firm* — Ostrolenk Faber LLP

(57) ABSTRACT

A device for folding blanks has a bottom conveyor (30) capable of conveying blanks along a conveyance path (10). The bottom conveyor (30) includes several longitudinal side frame members (40a, 40b, 40c) each supporting an endless conveyor belt (38) guided along the conveyance path (10) by top rollers (31, 31a, 31b, 32, 33). At least one member (50) folds a front tab of a blank. The folding member (50) is static. At least one top roller (32) is offset vertically from the other top rollers so that the conveyance path is curved, and the folding member (50) is suspended in the vicinity of the offset roller (32) in a position to intercept a front tab.

10 Claims, 6 Drawing Sheets

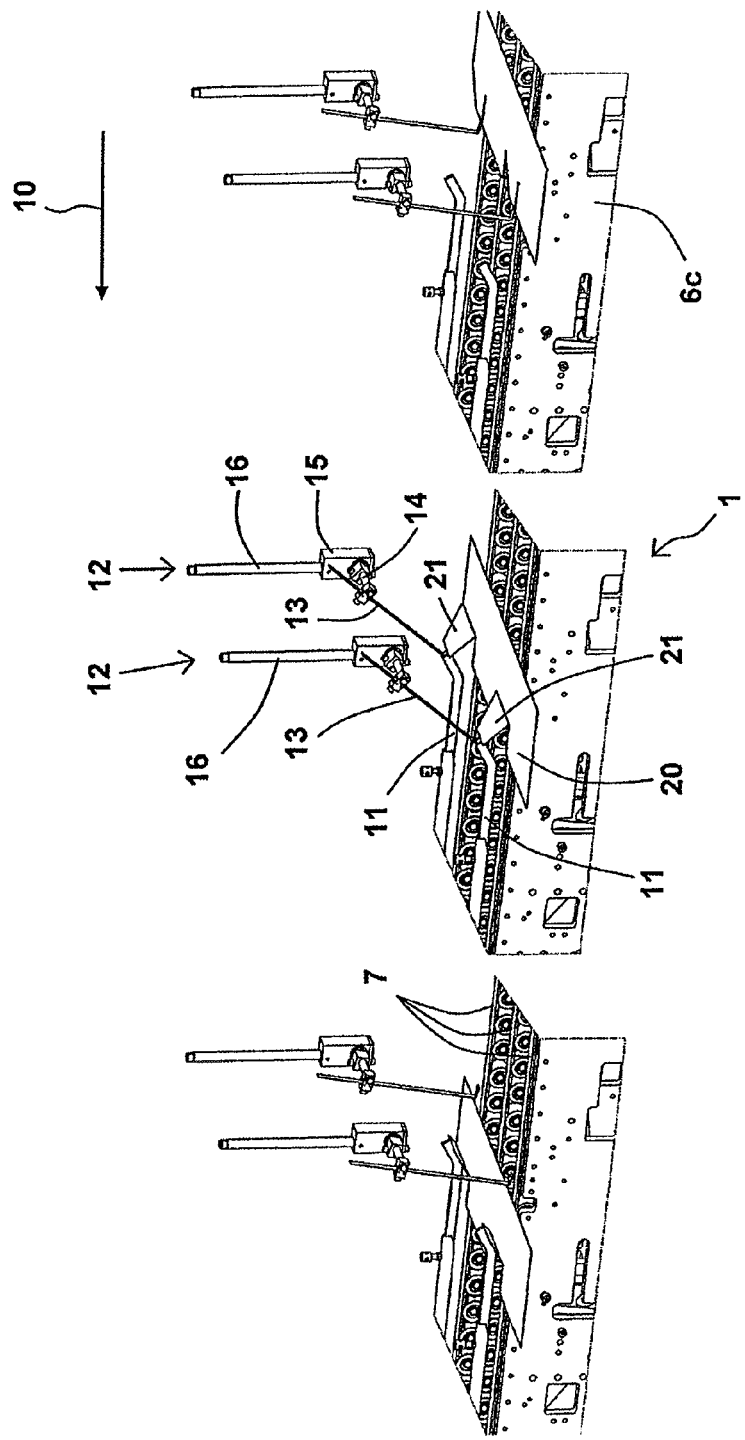

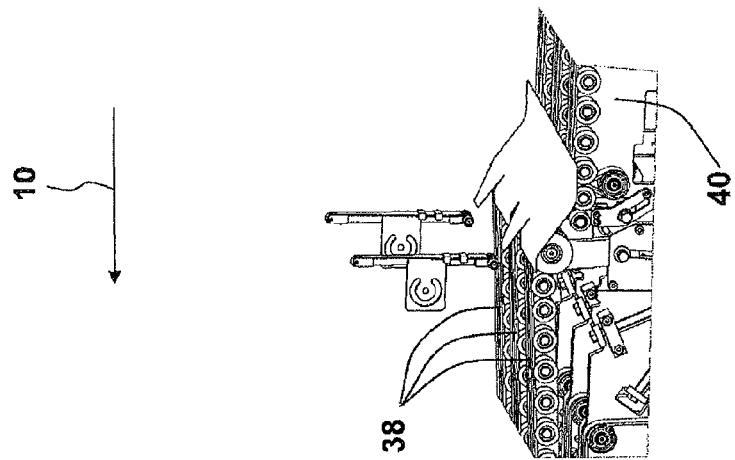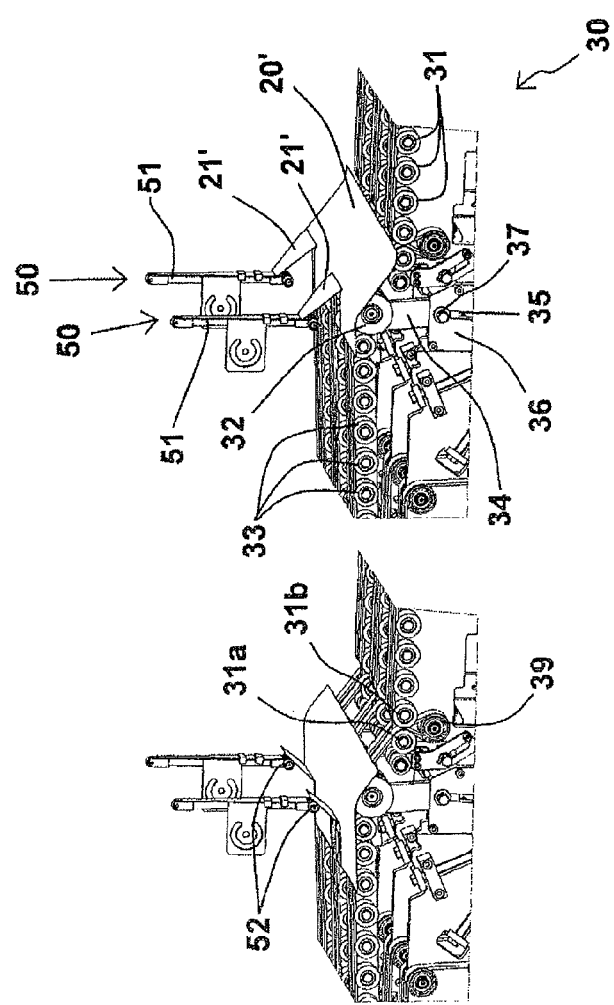

DEVICE FOR CONVEYING AND FOLDING BLANKS

CROSS-REFERENCE TO RELATED APPLICATIONS

The present application is a 35 U.S.C. §§371 national phase conversion of PCT/EP2009/006716 filed Sep. 17, 2009, which claims priority of European Application No. 08017185.3, filed Sep. 30, 2008, the contents of which are incorporated by reference herein. The PCT International Application was published in the French language.

TECHNICAL FIELD

The present invention relates to a device for folding plate elements of low specific weight such as for example blanks of paper, of cardboard, of corrugated cardboard or of plastic.

The invention also relates to a device for conveying plate elements of low specific weight.

The invention relates to a folding-gluing machine, that is a machine that converts plate elements of low specific weight, such as blanks of paper, of cardboard, of corrugated cardboard or of plastic, into folded boxes.

PRIOR ART

To manufacture, for example, a standard box, the blank used comprises four longitudinal folding lines and two transverse folding lines defining longitudinal panels and transverse tabs. For this type of box, only the longitudinal panels are folded in the folding-gluing machine, the transverse tabs are folded outside the folder-gluer. "Transverse tabs" mean the tabs that are folded along the transverse folding lines.

There is also an example of boxes using the same type of blank in which the front tabs, like the longitudinal panels, are folded in the folding-gluing machine; these boxes are called crash-lock bottom boxes. "Front tabs" mean the downstream transverse tabs.

The standard boxes and the crash-lock bottom boxes are usually manufactured in the same folding-gluing machines. A folder-gluer comprises a series of work stations, particularly a feeder supplying the production of boxes blank by blank from a stack, an alignment module, a breaker prebreaking the first and third longitudinal folding lines of the blank between 90° and 180°, a folder module capable of folding at 180° the front tabs of the blank, a gluing station, a folder for folding the second and fourth longitudinal folding lines of the blank, a presser which compresses the second and fourth longitudinal folding lines and places the boxes in an overlapping stream, and finally, a reception module which receives the boxes while keeping them pressed in order to allow the glue to dry. The conveyance of the blanks from one station to another is carried out with the aid of belt conveyors which, by friction, take hold of the blanks between a lower conveyor and an upper conveyor. Conventionally, the lower conveyor is furnished with lower belts while the upper conveyor is furnished either with upper belts or with upper bearing rollers. The points of contact of the lower conveyor with the upper conveyor define the path for conveying the blanks.

As a variant, the blanks can be held against the belts of the lower conveyor without the aid of an upper conveyor. Examples of a device for conveying blanks without an upper conveyor are described in U.S. Pat. No. 4,108,302 and WO9714634. In this known device, the lower conveyor is a conveyor with conventional belts interacting with a vacuum chamber. Another example of a device for conveying blanks without an upper conveyor is described in U.S. Pat. No. 4,614,512. In this known device, the lower conveyor is a conveyor with belts furnished with suction elements.

The lower conveyor usually comprises several longitudinal side frame members each supporting an endless conveyor belt guided by pulleys and rollers. Each side frame member is mounted side-slidingly through bearings along one or more movement slides attached transversely between two longitudinal frames. In order to adapt the side position of the side frame members to suit the format of the blanks to be processed, the sideways movement of each side frame member is provided by one or more parallel screws mounted in rotation between the frames, the threaded portions of the screws being respectively engaged in tapped transverse holes in the side frame members.

A front tab is usually folded thanks to a device comprising one or more elastic hooks suspended on a crossmember placed above the plane of travel of the blanks, the bottom end of these hooks penetrating the plane of travel of the blanks, see for example U.S. Pat. No. 3,285,144.

In certain cases, however, a solution avoiding placing folding members across the path of the blanks has been found to be more simple, and even necessary, which has led to the use of conveniently directed nozzles, blowing a jet of compressed air against the tab to be folded; the jet of air being used to begin the folding of the front tab, the folding then being completed with the aid of rigid elements which are then no longer in the actual trajectory of the blanks.

Also known are folding devices in which the aforementioned nozzles are replaced by lifting fingers situated beneath the plane of travel of the blanks, these fingers being operated by an alternating back-and-forth movement, see for example U.S. Pat. No. 4,052,932.

In U.S. Pat. No. 4,018,144, the proposal is to fold the front tab of a blank by running said blank into a belt conveyor of which one section is convex. A conveyor of this type comprises successively from upstream to downstream: a horizontal section, a concave section, a convex section, a concave section and a horizontal section. When the front tab to be folded enters the convex section of the conveyor, it projects outside the convex conveyance path in a direction that is substantially tangential to this path. An elastic folding hook suspended on a crossmember is placed above the convex section in said direction of projection of the tab. Therefore, running the blank into the convex section brings the front tab without fail against the elastic folding hook.

In patent DE19535903, the proposal is also to fold the front tab of a blank by running said blank into a belt conveyor of which one section is convex. This folding device differs from the device described in U.S. Pat. No. 4,018,144 in that the folding member is not elastic. In addition, unlike the device described in U.S. Pat. No. 4,018,144, this folding device is not adapted to fold blanks separated from one another. Specifically, although the front tab to be folded projects outside the conveyance path in the convex section of the conveyor, the direction of projection of the front tab is practically at right angles to said path when the blank travels beneath the folding member, so that the travel of the blank in the convex section does not automatically bring the front tab against the folding member; it requires the intervention of an operator. When the blanks arrive in an overlapping stream, it is sufficient for the operator to bring the front tab of the first blank against the folding member in order to guide the subsequent blanks of the stream toward the folding member. However, when the blanks arrive separate from one another, the operator has to manually bring the front tab of each blank against the folding member.

Folding devices requiring the intervention of an operator to manually bring the tab of a blank against the folding member are not satisfactory because they slow down the production of the boxes.

In folding devices using a moveable folding member in order to fold the front tab (elastic folding hook, lifting finger, etc.), the movement of the moveable member between a rest position and a working position is synchronized with the travel of the blanks, so the higher the speed of travel of the blanks, the shorter the time necessary for the moveable member to travel alternately from one position to the other. So long as it is not required to work at very high speed, the moveable member has the time to travel from the rest position to the working position. The same does not apply when it is required to work at very high speed, that is to say imposing on the blank a speed of conveyance that is higher than two hundred meters per minute. During practical tests at this speed, it was noted that the moveable member did not have the time to process all the blanks. Specifically, in the case of an elastic folding hook, the virtually continuous impact of the front tabs against the bottom end of the hook did not allow time for the hook to fall again between all the blanks, which caused folding defects. Similarly, in the case of a lifting finger, the back-and-forth speed of the finger was limited by the very design of the moveable member, in particular, the limit of mechanical strength of the parts forming the moveable member.

In folding devices using compressed air, it is necessary to provide a complete pneumatic installation including compressor, valves, pipes, nozzles, etc.; such an installation consumes a large amount of energy to produce compressed air, which is not satisfactory. In addition, the air coming out of the nozzles is a considerable source of noise, which is harmful to the working environment.

When it is desired to manufacture standard boxes in a folder-gluer adapted to the manufacture of crash-lock bottom boxes, it is advantageous to be able to place the device for folding the front tabs out of service in order to prevent the folding members from interfering with the blanks when they travel in the folding module, interference which could damage the blanks or slow down production of the boxes. It is for this reason that most of the folding devices of the prior art offer the possibility of moving the folding members away from the plane of travel of the blanks. Nevertheless, in a belt conveyor as described in U.S. Pat. No. 4,018,144 and DE19535903, even though it is possible to move the elastic folding hook away from the convex section of the conveyor, the obligatory travel of the blanks in this convex section lengthens the path of conveyance of the blanks (compared with a conveyor of same length but of horizontal section), which is not satisfactory in terms of productivity. Moreover, a blank which travels in two concave sections and one convex section of a conveyor as described in U.S. Pat. No. 4,018,144 sustains several longitudinal bends which may deform the blank and mark it. In the case of a corrugated cardboard blank, the deformation of the blank may break the fluting of the corrugated cardboard.

DESCRIPTION OF THE INVENTION

A first object of the invention is to remedy the aforementioned disadvantages by proposing a device for folding blanks of paper, of cardboard or of plastic which makes it possible to work at very high speed.

A second object of the present invention is to propose a device for folding blanks comprising a conveyance device that can be configured according to the type of boxes produced.

A third object of the present invention is to propose a device for conveying blanks that is particularly suited to the folding device according to the invention.

Another object of the present invention is to propose a device for conveying blanks which limits the deformation of the blanks when the front tabs are folded.

With a folding device hereof the front tabs of the blanks can be folded at high speed with no risk of defective folding or of mechanical breakage of the folding members.

The folding device hereof makes productivity optimal irrespective of the type of boxes produced.

In addition, the multipurpose conveyance device hereof the blanks that do not need to be folded transversely to pass through the folding device following a horizontal conveyance path which prevents deforming and marking of the boxes produced, on the one hand, and prevents slowing down their production on the other hand.

Finally, the conveyance device hereof enables the blanks to be less deformed and less marked during the folding of the front tabs.

Other objects and advantages of the invention will appear more clearly during the description of an embodiment, a description which will be made with reference to the appended drawings.

For the purpose of defining a few terms introduced in the present description and describing the position of certain elements within the folder-gluer, mention will be made of "operator side" and "opposite operator side" used indisputably to make reference to a designated side relative to the longitudinal midline of the machine. This choice makes it possible to avoid any confusion arising with the conventional designations, left and right, that depend on the point of view of the observer. For a similar reason, the orientation of certain movements or of certain parts will be described by the usual terms "longitudinal" and "transverse" always referring to the midline of the machine of which the direction is determined by that of the travel of the blanks. Finally, it will also be specified that the terms "upstream" and "downstream" for their part refer to the direction of travel of the blanks in the folder-gluer.

BRIEF DESCRIPTION OF THE FIGURES OF THE DRAWINGS

FIGS. 2a-2c are views in perspective of a portion of a folding device according to the prior art;

FIGS. 3a-3c are views in perspective of a portion of a folding device according to the invention;

BEST MODE OF EMBODYING THE INVENTION

Figure 1:
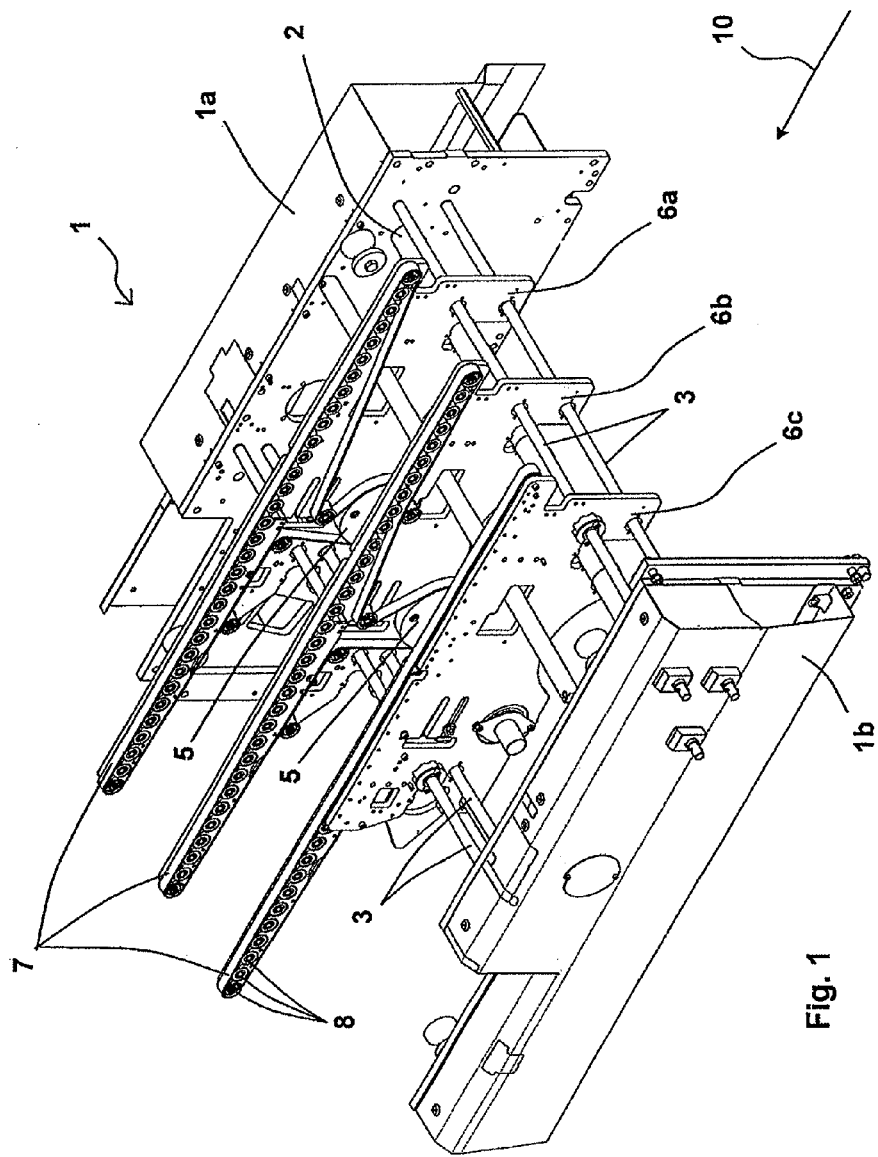
FIG. 1 is a view in perspective of a conveyor according to the prior art.

FIG. 1 illustrates a conveyor 1 according to the prior art. The arrow 10 indicates the direction of travel of the blanks also called the conveyance path. Such a conveyor usually comprises two longitudinal frames 1a, 1b that are parallel with and at a distance from one another. Each frame has two large faces: an inner face and an outer face, the inner face of one frame being turned toward the inner face of the other frame. In the example, the frame 1a is situated on the opposite operator side and the frame 1b is situated on the operator side.

Transversely placed between the two frames 1a, 1b are parallel cylindrical movement slides 2 (only one slide is shown), pairs of parallel movement screws 3 and a drive shaft mounted rotatably between the two frames (not shown). The movement slides 2 are fitted at each of their ends into the frames 1a, 1b; they are designed to support three parallel longitudinal side frame members 6a, 6b, 6c mounted side by side and each supporting an endless conveyor belt 7 resting on a hard horizontal plane, a plane formed by a series of upper rollers 8. Each longitudinal side frame member can be moved transversely between the frames 1a, 1b, along the movement slides 2, depending on the format of the blanks to be processed.

Devices (not shown) for pressing the blanks against the conveyor belts 7 are placed above certain portions of the side frame members 6a, 6b, 6c. These bearing devices may consist of a series of rollers held down by springs or of an endless belt of which the lower strand is pressed downward.

To change the transverse position of the side frame members 6a, 6b, 6c, the latter are mounted in helical connection with the movement screws 3. Specifically, the transverse movement of each side frame member is controlled by a pair of parallel screws 3, the threaded portions of which are respectively engaged in the transverse tapped holes of the side frame member, which screws are fixed in translation but free in rotation between the frames 1a, 1b. In order to turn the screws 3, one or more electric motors are provided (not shown).

Each endless conveyor belt 7 is supported by rollers and by a drive pulley 5. The drive pulleys 5 are coaxial and mounted so as to rotate freely on their respective side frame member. To drive the conveyor belts 7, the drive shaft has a hexagonal section interacting in shape with a transverse hole made in the spindle of each drive pulley 5. Therefore, when a side frame member 6a, 6b or 6c moves laterally under the action of a pair of adjusting screws 3, it slides along the movement slides 2 and along the drive shaft.

FIGS. 2a to 2c illustrate a folding device according to the prior art. This device comprises a conveyor 1 similar to that described with respect to FIG. 1, two moveable folding members 12 suspended on a crossmember (not shown) placed above the plane of travel of the blanks and two upper guides 11. Each folding member 12 comprises an elastic folding hook 13 consisting of an L-shaped metal strip. The bottom end of the folding hook 13 is situated in the plane of travel of the blanks while the top end of the folding hook is secured to a shaft 14 pivoting in a casing 15 about a transverse axis. A rigid rod 16 makes it possible to attach the casing 15 to the crossmember. A return spring housed in the casing 15 applies to the shaft 14 a torque which tends to hold the bottom end of the hook 13 in the plane of travel of the blanks; it is through this arrangement that the hook is called elastic. In order to illustrate the operating mode, a blank 20 with two front tabs to be folded 21 is shown in various phases of folding. In the phase illustrated in FIG. 2a, the blank 20 reaches the folding device following the direction of travel 10. The front tabs 21 and the longitudinal panels of the blank are substantially in the same horizontal plane. The bottom end of the folding hooks 13 is in the plane of travel of the blank 20 level with the front tabs 21.

In the phase illustrated in FIG. 2b, the blank travels beneath the folding members 12; as it passes the front tabs 21 are hooked by the bottom end of the folding hooks 13. Continuing to advance, the tabs 21 push on the hooks 13. Under the effect of this pressure, the hooks 13 move away from the plane of travel of the blank by pivoting on their transverse axis. The pivoting of the hooks at the same time causes the springs housed in the casings 15 to be placed in stress. The front tabs 21 initiate a beginning of folding by rising above the horizontal plane while the rest of the blank 20 is held against the conveyor belts 7 by any means known in the art, for example bearing devices as described above (not shown).

In the phase illustrated in FIG. 2c, the blank 20 travels beneath the upper guides 11; these guides are rigid slides extending in the longitudinal direction; the function of these guides is to complete the folding of the front tabs 21. Specifically, when the hooks 13 release the tabs 21, the latter press against a marginal portion of the upper guides 11. Because of the continued advance of the blank 20, the tabs 21 complete their fold by sliding beneath the guides 11. After having released the tabs 21, the folding hooks 13 are returned to the plane of travel of the blanks under the action of their respective return spring.

FIGS. 3a to 3c illustrate a folding device according to the invention. For comparison purposes, the folding device according to the invention is shown substantially in the same position as the folding device according to the prior art illustrated in FIGS. 2a-2c. This device comprises a lower conveyor 30 which differs from the conveyor of the prior art in that the hard plane on which the endless conveyor belts 38 rest is curved.

In the example illustrated in FIGS. 3a-3c, the hard plane of the lower conveyor preferably consists of a series of upper rollers 31, 31a, 31b, 32, 33. Considering a longitudinal side frame member 40 supporting an endless conveyor belt 38, the upper rollers 31, 31a, 31b are situated upstream of the side frame member, the upper rollers 33 are situated downstream of the side frame member and the upper roller 32 occupies an intermediate position between the upstream upper rollers 31, 31a, 31b and downstream upper rollers 33. The upstream upper rollers 31, 31a, 31b are arranged so as to form a horizontal hard plane. The upper roller 32 is mounted so as to rotate freely at the top of a substantially vertical arm 34. The portion of the arm 34 situated opposite the upper roller 32 is locked in a slide 35 by a screw 37. The slide 35 consists of a substantially vertical slot arranged in a plate 36 secured to the longitudinal side frame member 40. Being locked on top of the slide 35, the arm 34 causes the upper roller 32 to emerge above the horizontal hard plane formed by the upstream upper rollers 31, 31a, 31b. Through this arrangement, the upper strand of the endless conveyor belt 38 is guided upstream of the side frame member 40 by the upstream upper rollers 31 up to a roller 31b, then the belt 38 is diverted toward a guide roller 39 situated beneath the horizontal hard plane. The roller 39 guides the belt 38 toward the roller 31a situated downstream of the upstream upper rollers 31. Finally, the roller 31a guides the belt 38 toward the upper roller 32 which is offset vertically from the upstream upper rollers 31, 31a, 31b so that the conveyance path has a curved section.

Figure 4:
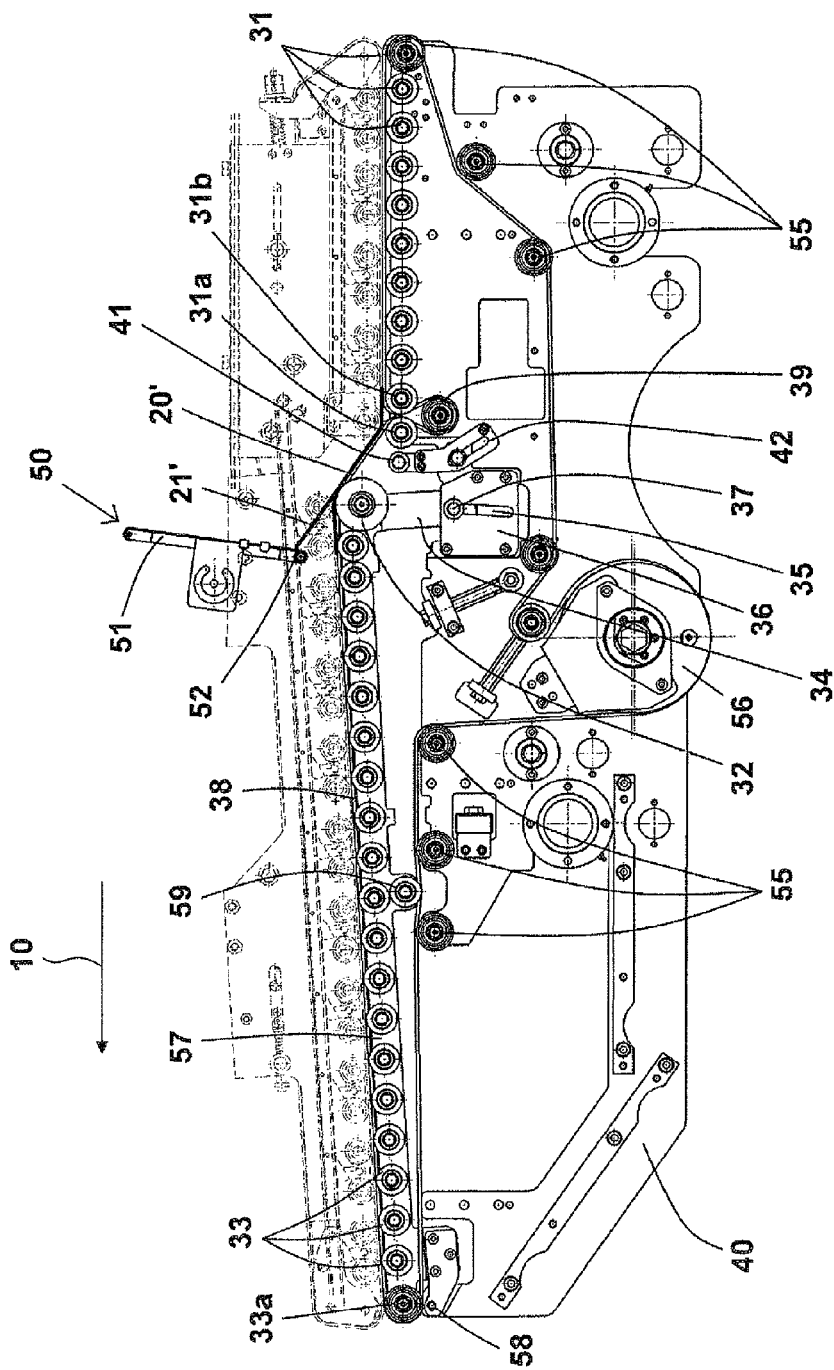
FIGS. 4 and 5 are views of a portion of a conveyance device according to the invention.

After the offset roller 32, the belt 38 is guided by the downstream upper rollers 33 toward a roller 33a situated downstream of the downstream upper rollers 33 (see FIG. 4). The roller 33a is situated in the same horizontal plane as the upstream upper rollers 31, 31a, 31b.

Advantageously, the offset roller 32 is situated in the same plane as the downstream upper rollers 33, 33a so that the hard plane on which the belt 38 rests downstream of the side frame member 40 is inclined. By this arrangement, the lower conveyor comprises successively from upstream to downstream: a horizontal section, a concave section, a convex section and an inclined-plane section. Thanks to this arrangement and, in particular, thanks to the fact that there is only one concave section and only one convex section, the blanks are less deformed.

In addition to the lower conveyor 30, the folding device according to the invention comprises two static folding members 50 suspended on a crossmember (not shown) placed above the plane of travel of the blanks. The folding member 50 is called static because it is not driven in any working movement. Each folding member 50 consists of a substantially vertical rigid bar 51. The top end of the bar 51 is attached to the crossmember while the bottom end of the bar 51 is situated above the offset roller 32, downstream of the latter.

To illustrate the operating mode specific to the invention, a blank 20' with two front tabs to be folded 21' is represented in different phases of folding. In the phase illustrated in FIG. 3a, the blank 20' reaches the curved section of the lower conveyor 40. Known means hold the blank 20' against the conveyor belts 38; these known means consist for example of bearing devices as described above (not shown). These bearing devices leave the front tabs to be folded 21' free so that the latter are not held against the belts 38. Therefore, when the blank 20' travels in the curved section, the front tabs 21' project outside the curved conveyance path in a direction that is substantially tangential to this path.

In the phase illustrated in FIG. 3b, the blank 20' travels beneath the folding members 50, and as they pass, the front tabs 21' are intercepted by the rigid bars 51 placed in the direction of projection of the front tabs 21'. FIG. 4 illustrates this phase in a front view on the operator side.

In the phase illustrated in FIG. 3c, the blank 20' continues to advance. Because the folding members 50 are static, the tabs 21' are forced to pivot about points of contact between the tabs 21' and the bars 51. Through this arrangement, folding of the front tabs 21' is achieved. To complete the folding, the blank 20' then travels beneath the upper guides as described above (not shown).

Advantageously, a roller 52 is mounted so as to rotate freely at the bottom end of each bar 51 in order to limit the friction of the front tabs 21' on the folding member 50.

FIG. 4 shows a detailed view of a longitudinal side frame member 40 of a conveyance device according to the invention. In addition to the elements already described with respect to FIGS. 3a-3c, the longitudinal side frame member 40 comprises lower rollers 55 and a drive pulley 56. The lower strand of the endless conveyor belt 38 is guided by the lower rollers 55; the pulley 56 drives the belt by friction. Advantageously, the offset roller 32 and the downstream upper rollers 33, 33a are mounted on one and the same ramp 57. The ramp of rollers 57 is capable of pivoting about a transverse axis 58 adjacent to the roller 33a. Again advantageously, the arm 34 is secured to the ramp 57 so that the offset roller 32 is at the apex of the angle formed by the arm 34 and the ramp 57. Preferably, an L-shaped part forms the arm 34 and the ramp 57.

Again advantageously, a roller 41 mounted on an articulated arm 42 is arranged so as to be able to be situated in the same plane as the upper roller 31a and the offset roller 32. Through this arrangement, the curved hard plane formed in the curved section can be reinforced.

Bearing devices as described above are shown in ghosted lines.

Figure 5:
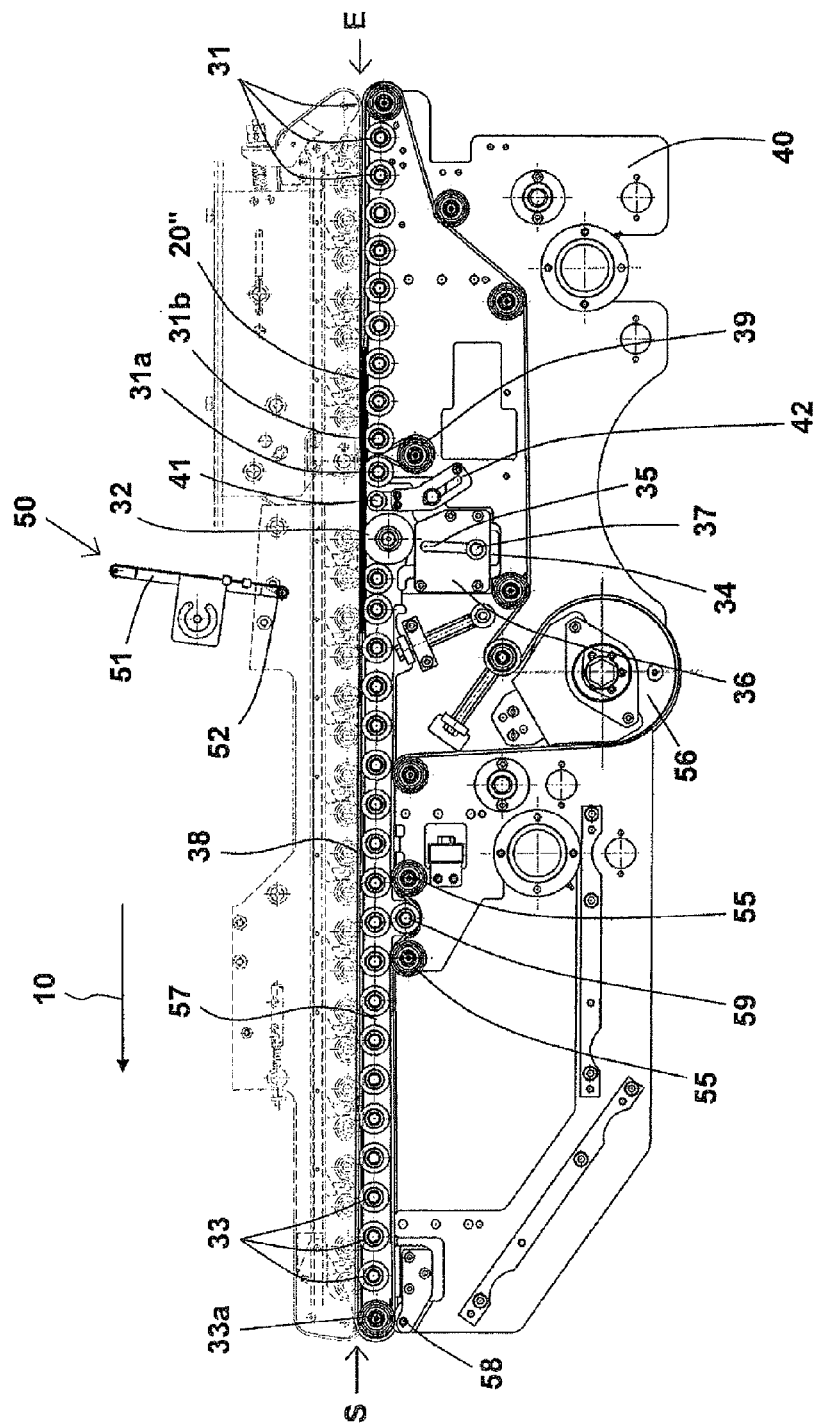

FIG. 5 shows the longitudinal side frame member 40 in a second configuration. This second configuration makes it possible for the blanks that do not need to be folded transversely to travel through the folding module following a horizontal conveyance path. This arrangement avoids unnecessarily deforming the blanks and shortens the conveyance path of the blanks through the folding module.

In the new configuration of the side frame member illustrated in FIG. 5, the ramp of rollers 57 adopts a horizontal position so that the upstream upper rollers 31, 31a, 31b, the upper roller 32 and the downstream upper rollers 33, 33a are all situated in one and the same horizontal plane. A blank 20" is shown traveling beneath the folding member 50. The blank 20" is a standard box blank, that is to say that it does not need to be folded transversely in the folding module, so, when the blank 20" reaches the entrance E of the folding module, it is conveyed directly to the outlet S of the folding module following a horizontal conveyance path.

In this configuration, since the distance that separates the bottom end of the bar 51 from the plane of travel of the blanks is much greater than the thickness of a blank, there is no interference of the folding device with the blanks 20". Advantageously, the roller 41 is designed so as to be able to be situated in the same plane as the upper roller 31a and the upper roller 32. Through this arrangement, the hard horizontal plane can be reinforced.

To bring the side frame member 42c into the second configuration, the upper roller 32 is height-adjustable. Specifically, by releasing the locked arm 34 at the top of the slide 35 (see FIG. 4), the arm 34 is brought to the bottom of the slide 35. When the arm 34 is at the bottom of the slide 35, the upper roller 32 mounted at the top of the arm 34 is situated in the same horizontal plane as the upstream upper rollers 31, 31a, 31b. Simultaneously, the ramp of rollers 57 is brought into a horizontal position by pivoting on its transverse axis 58. In this initial position, all the upper rollers are situated in one and the same horizontal plane so that the conveyance path 10 is horizontal.

Advantageously, a compensating roller 59 mounted on the ramp 57, beneath the downstream upper rollers 33, interacts with a pair of lower rollers 55 in order to take up the slack created in the endless conveyor belt 3-8 when the ramp 57 pivots.

To bring the side frame member 42c into the first configuration illustrated by FIG. 4, it is sufficient to lock the arm 34 in the slide 35 at the desired height. Although FIG. 4 shows the arm 34 at the top of the slide 35, it is possible to lock the arm in another position. The final position of the arm 34, and therefore of the upper roller 32, is determined by the geometry of the front tabs to be folded, in particular the length. In the final position, the upper roller 32 emerges above the horizontal plane formed by the upstream upper rollers 31, 31a, 31b so that the conveyance path 10 is curved.

Figure 6:
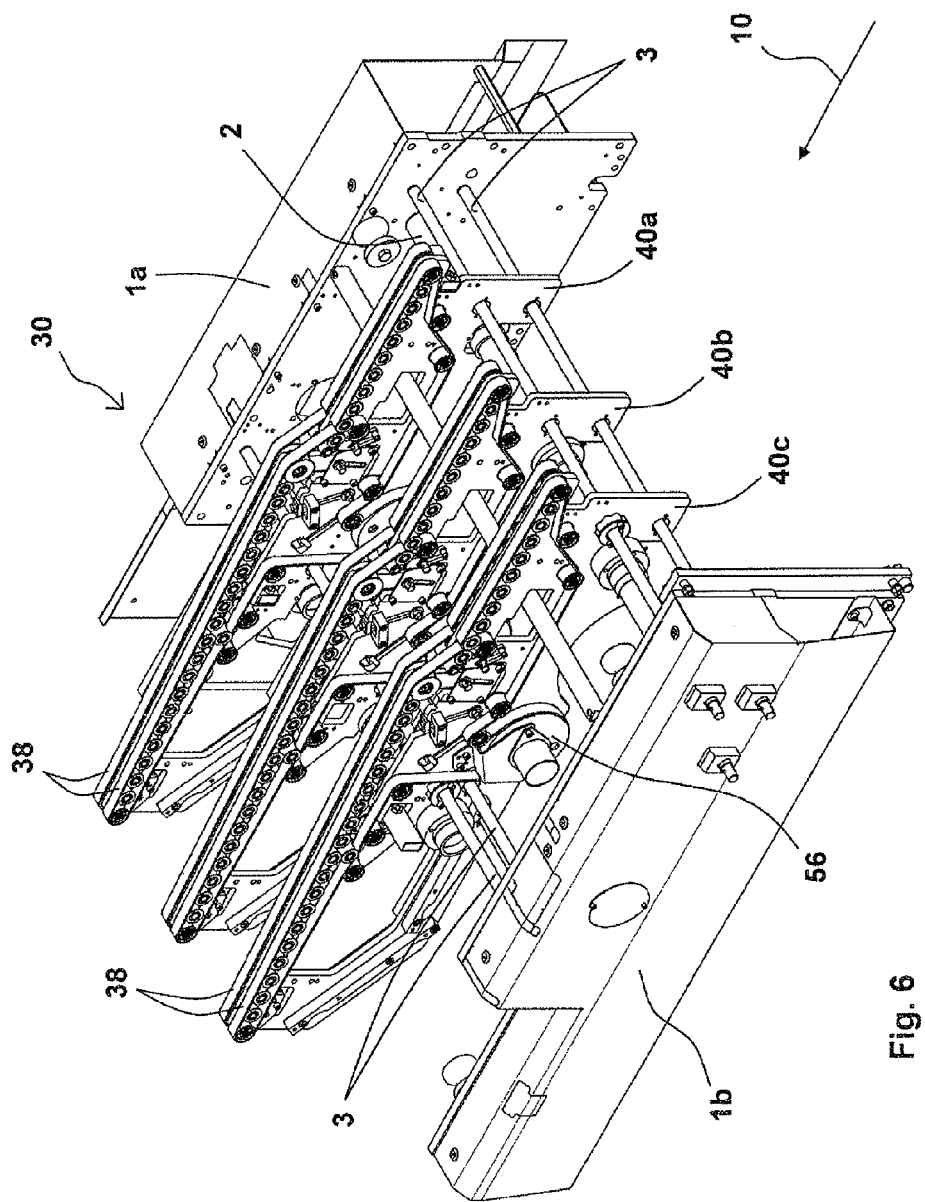
FIG. 6 is a view in perspective of a conveyance device according to the invention.

FIG. 6 illustrates a conveyance device according to the invention. The elements that are common to the conveyor of the prior art illustrated in FIG. 1 are repeated with the same reference numbers.

A conveyance device according to the invention usually comprises two longitudinal frames 1a, 1b that are parallel with and at a distance from one another. Each frame has two large faces: an inner face and an outer face, the inner face of one frame being turned toward the inner face of the other frame. In the example, the frame 1a is situated on the opposite operator side and the frame 1b is situated on the operator side. Placed transversely between the two frames 1a, 1b are parallel cylindrical movement slides 2 (only one slide is shown), pairs of parallel movement screws 3 and a drive shaft mounted rotatably between the two frames (not shown). The movement slides 2 are fitted at each of their ends into the frames 1a, 1b; they are designed to support three parallel longitudinal side frame members 40a, 40b, 40c mounted side by side and having the same features as the side frame member 40 described above. Each longitudinal side frame member can be moved transversely between the frames 1a, 1b, along the movement slides 2, depending on the format of the blanks to be processed.

Advantageously, each longitudinal side frame member 40a, 40b, 40c supports a pair of endless conveyor belts 38; a first belt is guided along the conveyance path preferably by upper rollers mounted on the side frame member on the operator side and a second belt is guided along the conveyance path preferably by upper rollers mounted on the side frame member on the opposite operator side. Through this arrangement, a better hold of the blanks is ensured during the folding of the front tabs by increasing the bearing points of the blanks on the lower conveyor belts 30, in particular in the curved section.

Devices (not shown) for pressing the blanks against the conveyor belts 38 are placed above certain portions of the side frame members 40a, 40b, 40c. These bearing devices may consist conventionally of a series of rollers held down by springs or of an endless belt of which the lower strand is pressed downward. The portions of the side frame members above which there are no bearing devices are those where the folding members are.

The aforementioned bearing devices are only an example of means for holding the blanks against the lower conveyor belts along the conveyance path. Specifically, according to the prior art, the blanks may be held against the conveyor belts 38 without the aid of bearing devices. In this case, the conveyance path of the blanks is defined by the path of the upper strand of the endless conveyor belt 38.

In the examples illustrated above, the belts of the lower conveyor are guided along the conveyance path preferably by upper rollers mounted so as to rotate freely; it goes without saying that any other means for guiding the belts comprising a portion that is vertically offset or height-adjustable forms part of the invention. For example, plastic guides on which the belts slide without friction.

Finally, although the examples illustrated above show blanks arriving at the folding module separated from one another, the invention also applies to blanks arriving in a stream, that is to say overlapping one another.

The invention claimed is:

1. A device for folding a foldable tab portion of a plate element, comprising:
    a lower conveyor configured for conveying a plate element having a foldable tab along a conveyance path, said lower conveyor comprising at least one longitudinal side frame member;
    at least one endless conveyor belt supported by said longitudinal side frame member;
    upper guidance devices supported by said at least one longitudinal side frame member;
    at least one static folding member;
    said lower conveyor, in a state of operation, having, from an upstream position to a downstream position, a horizontal section, a concave section, a convex section, and an inclined section;
    a bearing device arranged at least opposite the convex section to hold a portion of a plate between the convex section and the bearing device but positioned to avoid engagement with the foldable tab of the plate;
    said folding member being located above the convex section of the lower conveyor and positioned to intercept the foldable tab portion of a plate element that projects in a direction tangential to the convex portion.

2. A folding device according to claim 1, wherein said upper guidance devices comprise upper rollers;
    at least one upper roller is offset vertically from the other upper rollers to obtain said convex section; and said folding member is suspended in a vicinity of said offset roller in a position to intercept said foldable tab of said plate element.

3. A folding-gluing machine comprising a folding device according to claim 1.

4. A device for folding foldable plate elements, comprising:
    a lower conveyor configured for conveying said plate elements along a conveyance path, said lower conveyor comprising at least one longitudinal side frame member;
    at least one endless conveyor belt supported by said longitudinal side frame member for guidance along said conveyance path;
    upper guidance devices, said upper guidance devices including first guidance devices and second guidance devices;
    at least one folding member configured and positioned for folding a foldable front tab of a plate element conveyed past said at least one folding member;
    said first guidance devices being selectively displaceable relative to said second guidance devices, wherein in an initial position said upper guidance devices are aligned to define a horizontal conveyance path and in a final position said first guidance devices are displaced relative to said second guidance devices to define from an upstream position to a downstream position, a horizontal section, a concave section, a convex section and an inclined section; and wherein in said initial position, said folding member is positioned and configured so as not to interfere with said plate elements, and in said final position, the folding member is positioned to intercept said foldable tab of a traveling plate element that is oriented tangential to said convex section.

5. A folding device according to claim 4, wherein said upper guidance devices comprise upper rollers;
    at least one upper roller is adjustable in height with respect to said conveyance path between an initial position in which said adjustable roller is aligned with the other upper rollers so that said conveyance path is horizontal and a final position in which said adjustable roller is offset vertically with respect to said conveyance path from the other upper rollers to obtain said convex section, and in said final position, said folding member is suspended in a vicinity of said offset roller and is configured and in a position to intercept said foldable tab.

6. A device for conveying plate elements, comprising:
    a lower conveyor configured for conveying said plate elements along a conveyance path, said lower conveyor comprising at least one longitudinal side frame member;
    at least one endless conveyor belt supported by said longitudinal side frame member for guidance along said conveyance path;
    upper guidance devices to guide said plate elements along a conveyance path;
    said upper guidance devices including first guidance devices and second guidance devices, wherein said first guidance devices are selectively displaceable relative to the second guidance devices to change the conveyance path from a horizontal conveyance path to a conveyance path that includes, from an upstream position to a downstream position, a horizontal section, a concave section, a convex section, and an inclined section.

7. A conveyance device according to claim 6, wherein, in said final position, said lower conveyor comprises a single convex section following a single concave section along said conveyance path.

8. A conveyance device according to claim 6, wherein said lower conveyor interacts with bearing devices above said lower conveyor and said plate elements in order to convey said plate elements along said conveyance path.

9. A conveyance device according to claim 6 further comprising two endless conveyor belts supported by said longitudinal side frame member.

10. A conveyance device according to claim 6, in which said upper guidance devices comprise upper rollers, at least one said upper roller is adjustable in height with respect to said conveyance path between an initial position in which said adjustable roller is aligned with the other upper rollers so that said conveyance path is horizontal and a final position in which said adjustable roller is offset vertically with respect to said conveyance path from the other upper rollers to obtain said convex section.

\* \* \* \* \*

UNITED STATES PATENT AND TRADEMARK OFFICE
CERTIFICATE OF CORRECTION

PATENT NO.        : 8,647,248 B2
APPLICATION NO.   : 13/121865
DATED             : February 11, 2014
INVENTOR(S)       : Criblez et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 296 days.

Signed and Sealed this

Twenty-ninth Day of September, 2015

Michelle K. Lee
*Director of the United States Patent and Trademark Office*